May 28, 1935. C. A. SCHROEDER 2,002,801
FOOD COOKING DEVICE
Filed Nov. 27, 1934 2 Sheets-Sheet 1
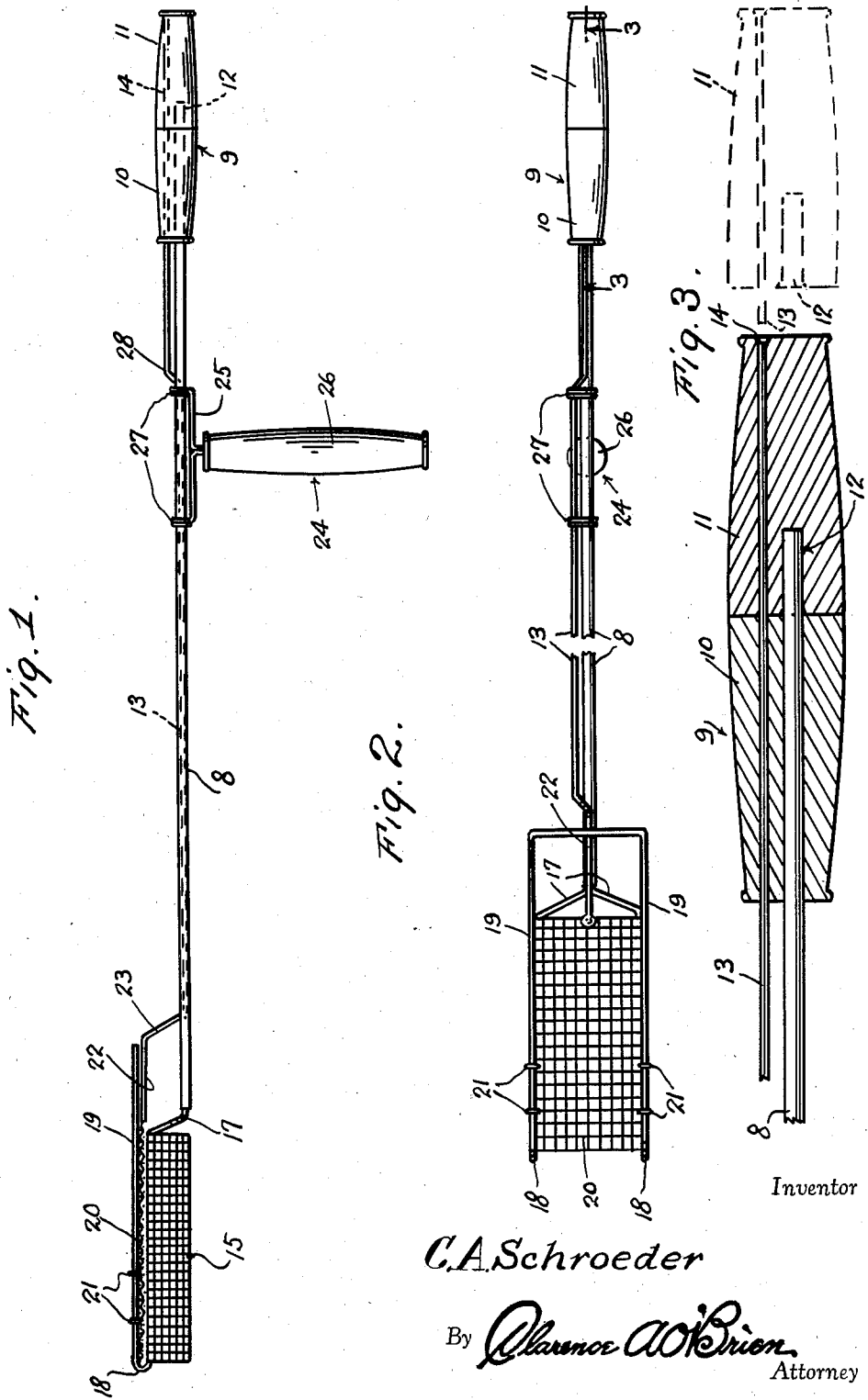
Inventor
C. A. Schroeder
By Clarence A. O'Brien
Attorney

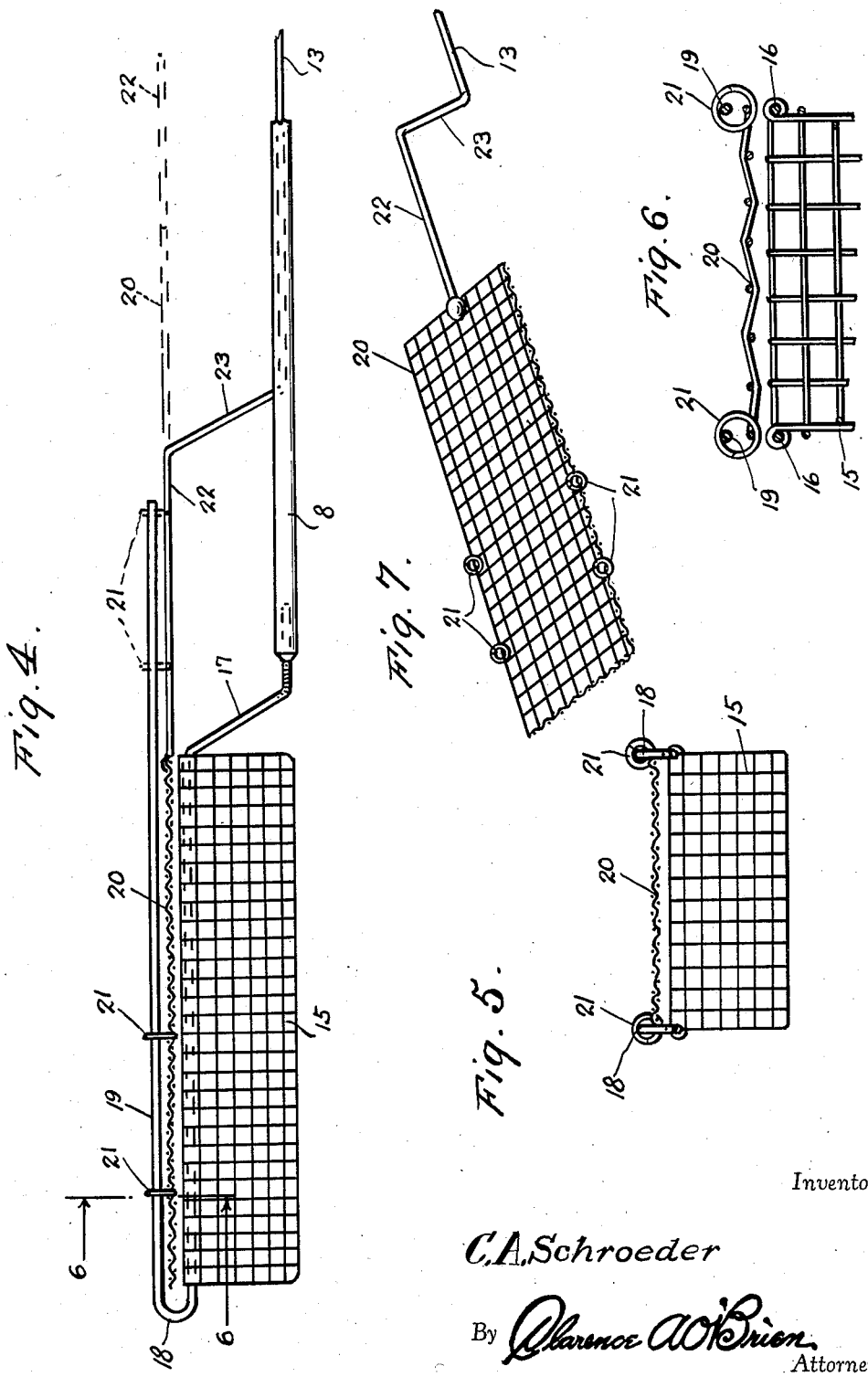

Patented May 28, 1935

2,002,801

UNITED STATES PATENT OFFICE 2,002,801

FOOD COOKING DEVICE

Clarence Andrew Schroeder, Appleton, Wis.

Application November 27, 1934, Serial No. 755,049

1 Claim. (Cl. 53—4)

This invention relates broadly to a novel device for cooking various kinds of foods, and it has more particular reference to an ingenious portable appliance which is susceptible of satisfactory and expeditious usage for broiling and roasting such articles as steaks, frankfurters, and marshmallows over a so-called camp fire.

The invention was conceived and structurally perfected with the thought in mind of providing a structure for accomplishing the aforementioned results, which structure is especially desirable for use by scouts, members of similar out-of-doors organizations, and camping and picnicking persons.

In reducing the invention to actual practice, I have evolved and produced a simple and economical utensil or device which has a handle at one end, an elongated reach rod, and a cage-like receptacle at the outer end of said rod, whereby to permit said receptacle to be conveniently held over a camp fire for broiling or roasting the contents thereof.

One structural feature is predicated upon the adoption and use of an openwork wire basket to serve as a receptacle for the article to be cooked, said basket being provided wtih a screen-type closure or lid, and there being remote control means for said lid whereby to permit it to be actuated according to the discretion or dictates of the user.

An equally important feature has to do with the aforementioned reach rod and cage arrangement, wherein said reach rod is mounted to be rotated in a special adapter fixture, said fixture having a suitable hand-grip whereby it may be conveniently held and adjusted to requisite position to balance and properly support this otherwise unwieldy structure and to at the same time allow the cage to be turned over and over for effectively roasting the article of food on all sides.

Other features and advantages will become more readily apparent from the following description and drawings.

In the drawings:

Figure 1 is a side elevational view of the complete assembly showing the parts arranged in accordance with my ideas.

Figure 2 is a top plan view of the assemblage depicted in Fig. 1, the view being slightly contracted in a longitudinal direction, for convenience of display.

Figure 3 is an enlarged fragmentary longitudinal sectional view taken approximately on the plane of the line 3—3 of Fig. 2.

Figure 4 is a similar enlarged fragmentary elevational view of the cage-like container at the opposite end of the reach rod showing the essential features or details thereof and showing in particular the slidable cover arrangement.

Figure 5 is a front end elevational view of Figure 4, that is a view observing it in a direction from left to right.

Figure 6 is an exaggerated sectional view taken approximately on the plane of the line 6—6 of Fig. 4.

Figure 7 is a detail perspective view illustrating the cover and its operating wire.

Referring now to the drawings by distinguishing reference numerals, it will be observed that the aforesaid reach rod, which is of appropriate dimension and material, is denoted by the numeral 8. At the inner end of this rod is a suitable handle 9. The handle, as better shown in Fig. 3, is actually made up of two companion sections, that is, a stationary inner section 10 and a slidable or relatively movable outer section 11. The latter section is provided with a socket 12 to accommodate the adjacent end of the reach rod. Incidentally this extended end of the rod projects beyond the corresponding end of the stationary section 10. A push-pull wire 13 extends through a guide passage in the section 10 and is anchored as at 14 to the movable section 11.

Referring now to Fig. 4 showing the outer end of the rod 8, attention comes first to the openwork wire basket 15 which is of suitable shape and proportions to accommodate frankfurters, a small steak, marshmallows or the like. This basket is mounted on the spaced parallel side members 16 (see Fig. 6) of a wire frame. The ends of said side members are bent down as indicated at 17 and attached to the reach rod 8, as shown in Fig. 4, to properly position and balance the basket. The opposite end of the wire portions of the frame are bent upwardly upon themselves as at 18 in return-bend fashion so as to provide a horizontal U-shaped member 19 overlying and extending beyond the top of the basket. This frame 19 is in effect a track for the screen cover or lid 20 and the lid is provided with guide rings 21 which slide on the track members. It will be noted that the push-pull wire 13 has its outer end 22 attached to the lid and then bent down as at 23 to dispose its body portion in close proximity to the reach rod. The wire extends along the reach rod and through a passage in the section 10 where, as before stated, it is attached to the adjusting or movable section 11 of the handle. Consequently, by grasping the section 11 and pulling it out to the dotted line position shown in Fig. 3, this exerts a pull on the wire 13 and in turn slides the rings 21 of the cover 20 on the track rails, moving the cover to open position to allow the articles of food to be inserted into the basket conveniently. Then the cover is slid to closed position to form the complete cage for retention of the article of food (not shown) to be roasted or broiled as the case may be.

Attention is next invited to Fig. 1 wherein it will be observed that the numeral 24 designates a handling device or adapter. This embodies a wire yoke 25 mounted on a suitable hand grip 26 and having guide eyes 27 slidable on the wire 13 and reach rod 8. These eyes 27 are in effect bearings and by using the device 24, the long reach rod cannot only be better balanced, but the handle 9, reach rod and basket can be turned or rotated as a unit for more effective roasting purposes. This part 24 is an ingenious device which will doubtless be endorsed because it enables the complete device to be more successfully manipulated and avoids it becoming an unwieldy device otherwise calculated to unnecessarily tire the user. It stands to reason that the long reach rod and comparatively heavy basket with the food in it is not susceptible of being easily handled or held over the camp fire. That is to say, the reach rod must be sufficiently long to enable the user to stand quite far from the fire for comfort and convenience. Thus, the device would seem over-balanced on the basket end but by using the adapter 24, this otherwise inconvenient factor is compensated for. It might be mentioned as an incidental feature that the wire 13 is offset at one end as indicated at 28 in Fig. 1 primarily to allow it to pass through the eccentric passage or bore in the handle section 10. It is obvious, however, that this bend might also serve to allow the adjacent eye 27 to be forced against it to clamp the wire against the reach rod and to virtually lock the cover 20 in closed position. This cover-locking feature may be desired under certain conditions, especially if and when the parts 11 become unduly worn and loose.

Summing up features and advantages, I would call attention to these in particular. Novelty is predicated first on the handle 9, the elongated reach rod 8 and the slidable cover-equipped wire basket or cage at the outer end of the reach rod. Additional novelty is predicated on the frame which carries the basket 15 and which has the additional function of forming an overhead track for the guide eyes 21 of the slidable wire cover 20. An additional feature is found in the arrangement shown in Fig. 3 comprising the sectional handle with the fixed section 10 and the slidable section 11, these parts cooperating to accommodate the push-pull wire 13 which serves as a remote control feature for the slidable cover. Particular emphasis is attached to the balancing adapter unit 24. This is bodily slidable so that it can be adjusted to best suit the user for balancing the otherwise unwieldly cage. Then too, it serves as a convenient fixture for supporting the reach rod so that the rod can be turned or oscillated, whichever is desired, for more effective roasting purposes. All of these parts have been carefully selected in the hope of fulfilling the requirements of the invention in a complete and satisfactory manner.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of the invention claimed, may be resorted to in actual practice, if desired.

I claim:

In a structure of the class described, a receptacle, a slidable cover for said receptacle, a reach rod connected with the receptacle, an actuating wire connected with said cover, a handle attached to the inner end of said rod and including a stationary section and a relatively movable companion section, the stationary section having a passage through which said wire extends, and said wire being anchored in said movable section to allow said movable section to be actuated for adjusting the cover.

CLARENCE ANDREW SCHROEDER.